Dec. 30, 1952 G. R. FORBAS 2,623,759
WHEEL CHOCK FOR WHEELED VEHICLES
Filed Aug. 3, 1950 2 SHEETS—SHEET 1

INVENTOR.
Gilbert R. Forbas
BY
Barnes, Kisselle, Laughlin & Raisch
Attorneys.

Dec. 30, 1952 G. R. FORBAS 2,623,759
WHEEL CHOCK FOR WHEELED VEHICLES
Filed Aug. 3, 1950 2 SHEETS—SHEET 2

INVENTOR.
Gilbert R. Forbas
BY
Barnes, Kisselle, Laughlin & Raisch
Attorneys.

Patented Dec. 30, 1952

2,623,759

UNITED STATES PATENT OFFICE 2,623,759

WHEEL CHOCK FOR WHEELED VEHICLES

Gilbert R. Forbas, Detroit, Mich.

Application August 3, 1950, Serial No. 177,497

7 Claims. (Cl. 280—179)

In the matter of manufacturing articles, parts, devices, etc., it is quite a common practice to place the same in a container. For example, when such articles or parts have an operation performed thereon by a machine, the articles or parts, which may be either completely finished or partly finished, are placed into a container and then the container may be moved to another location where another operation is performed on the articles or parts, or to a location where the same, if in finished form, are assembled into a complete assembly or sub-assembly, or otherwise handled.

Sometimes the containers are in the form of vehicles in the sense that they are equipped with wheels so that they can be moved about. Such containers are and may conveniently be herein called stock trucks and the material or materials carried and transported thereby may be termed stock.

This invention is directed to the provision of means for transporting the stock trucks. For example, stock trucks loaded with stock may be transported some distance from one plant to another or from a location in one plant to a remote location in the same plant. To avoid the necessity of handling and rehandling the stock it is convenient to transport the entire stock truck. Accordingly, a plurality of loaded stock trucks may be moved on their wheels onto the platform or bed of a larger vehicle which may be termed a road vehicle or transporting vehicle and the plurality of stock trucks thus transported. Of course, on the return trip empty stock trucks may be transported.

The principal object of the present invention is to provide a wheel chock so that stock trucks may be rolled onto the platform of a road vehicle on a track or in a guideway on the vehicle and each stock truck may be held positioned by the wheel chocks. In accordance with the invention the wheel chocks are disposed in properly spaced relationship on a track or guideway so that the stock trucks may be rolled over the same since the forwardmost stock trucks must roll over the wheel chocks for the rearwardmost stock trucks and then the wheel chocks may be adjusted to hold each stock truck in its position.

The invention is demonstrated in the accompanying drawings.

Figure 1:
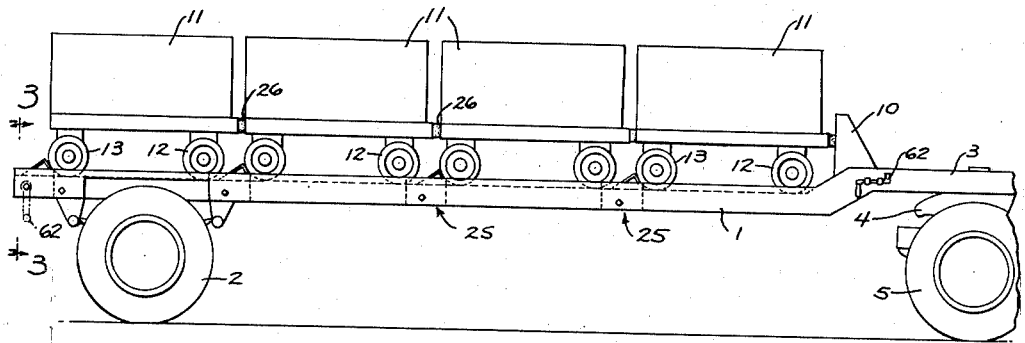
Fig. 1 is a side elevational view illustrating a road vehicle with a plurality of stock trucks thereon and showing the wheel chocks.

In Fig. 1 the road vehicle is shown as being in the form of a semi-trailer having a frame 1 and rear ground engaging wheels 2. The front end of the semi-trailer, as indicated at 3, rests upon a coupling or fifth wheel member 4 mounted on the rear end of a suitable tractor having wheels 5. Such tractor semi-trailer combinations are well known to those versed in the art and further detailed description is not necessary. Of course, the transporting vehicle need not be a trailer but may be in the form of any other vehicle which may have its own power plant.

There is preferably a stop 10 near the front end of the trailer and, as shown, there are a plurality of stock trucks on the transporting vehicle. Each stock truck has a body 11 which may be of box form for receiving the stock and each stock truck is provided with the wheels as, for example, the front wheels 12 and rear wheels 13. Some of the wheels may be dirigible or in the form of caster wheels for convenient manipulation of the stock trucks.

Figure 2:
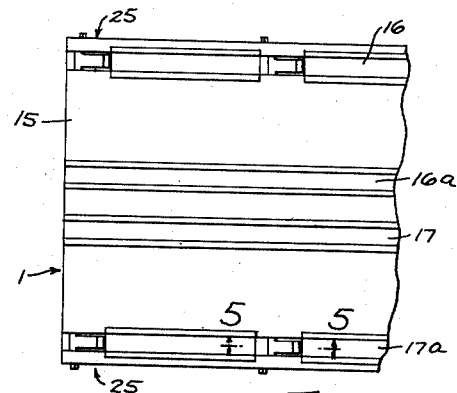
Fig. 2 is a partial view in plan looking at the bed of the road vehicle showing the track and the chocks.

As shown in Fig. 2, the transporting vehicle 1 has a bed or platform 15 with tracks provided thereon. There are two tracks 16 and 16a for one line or series of stock trucks and two other tracks 17 and 17a for another line or series of stock trucks. As shown herein each track is in the form of a channel (Figs. 3 and 5) having a bottom portion 20 inset or recessed from the plane of the bed 15 and side walls which may be defined by strips of angle iron 21.

This, of course, is just one form of track. Accordingly, a series of stock trucks may be rolled onto the platform of the transporting vehicle with the wheels of the forward truck rolling in the channels 17 and 17a, for example, until it meets the stop 10 and then the other stock trucks are rolled in behind. Where the size of the stock trucks permit, the vehicle may, as demonstrated in Fig. 2, have two sets of tracks for accommodating two rows or lines of stock trucks.

A wheel chock is provided for each stock truck and, as shown in Fig. 1, there is a wheel chock 25 for engaging behind one rear wheel of each stock truck. These chocks thus hold the vehicles in position with the forward stock truck engaging the stop 10 and with the several stock trucks preferably engaging each other for which purposes each stock truck may be provided with a suitable projection or bumper 26.

Figure 3:
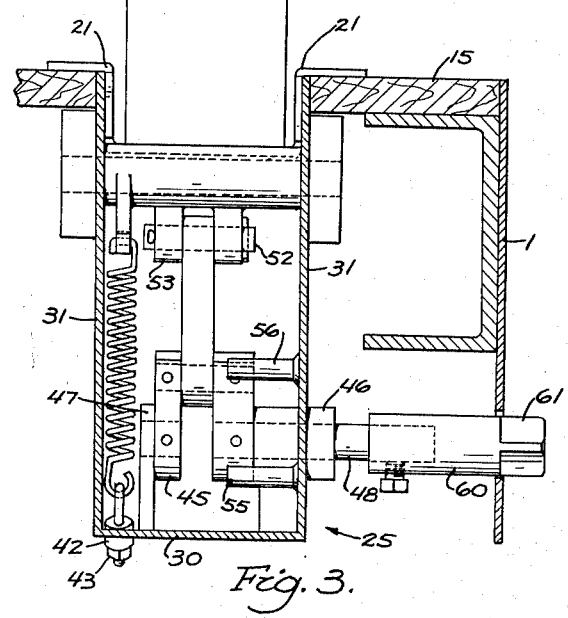
Fig. 3 is an enlarged view partly in section taken on line 3—3 of Fig. 1 showing a chock in blocking position.
Figure 4:
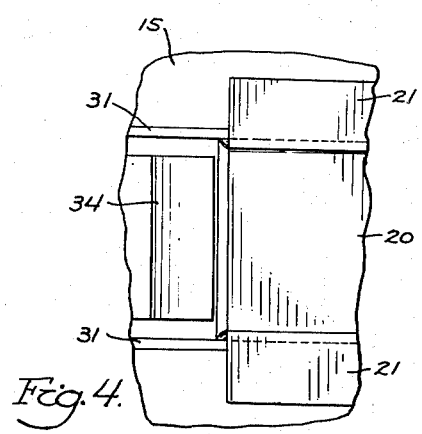
Fig. 4 is a view in plan illustrating a portion of track and a portion of a chock.
Figure 5:
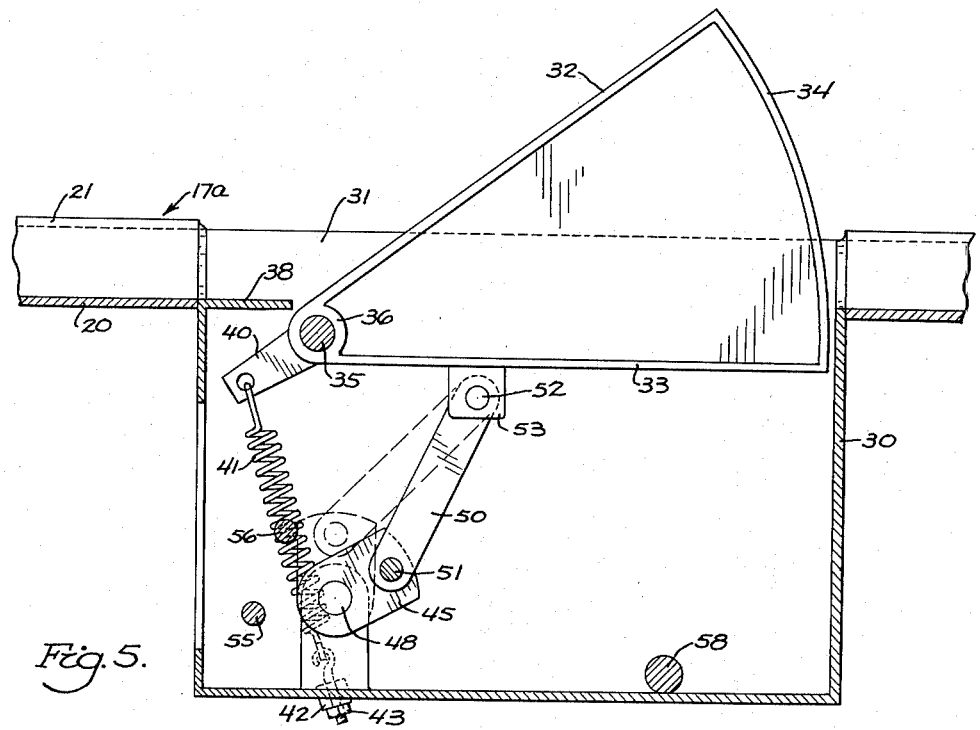
Fig. 5 is a view partly in section taken substantially on line 5—5 of Fig. 2 showing a chock in blocking position.
Figure 6:
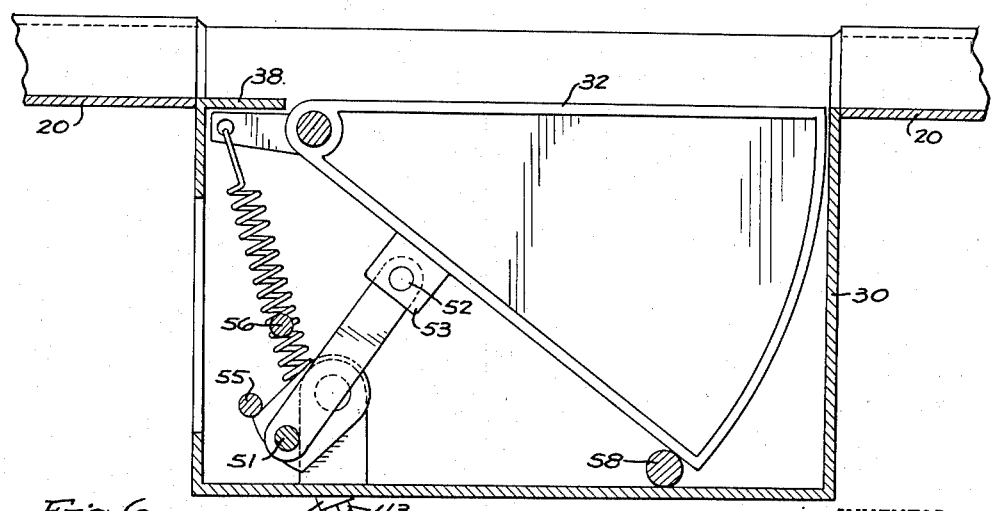
Fig. 6 is a view similar to Fig. 5, showing the chock in depressed, non-blocking position.

The wheel chock is set into the track structure, as shown in Figs. 3, 5 and 6. As demonstrated in Figs. 3 and 5 the track section is cut away or divided and a supporting box formation 30 depends below the track. This box formation may be welded in place and its side walls 31 form continuations of the side rails 21 of the track.

The chock member, as shown in Fig. 5, is advantageously somewhat in the form of a segment of a circle having an upper member 32 and a lower member 33 and an outer surface member 34 conveniently formed on an arc about the radius of the pivotal mounting of the chock member. This pivotal mounting is shown as in the form of a stud 35 while the chock member has a bearing structure 36 mounted thereon. The chock member may conveniently be of metal pieces formed and welded together.

The supporting structure for the chock has an extending piece 38 which forms a part of the bottom of the track and when the chock member is positioned, as shown in Fig. 6, the portion 38 and the member 32 of the chock member complete the track so that a stock truck may be rolled over the same.

The chock member has a tail piece 40 acted upon by a coil spring 41 anchored at one end as shown at 42 so that the tension of the spring may be adjusted by the means of a nut 43.

For the purpose of operating the chock there is a crank 45 mounted in bearings as at 46 and 47 provided with an extending stub shaft 48. A link 50 is connected at one end to the crank as shown at 51 and at its opposite end it is pivotally connected to the chock member as by means of a pin 52 mounted in a clevice structure 53 on the chock member. There is a stop pin 55 for limiting the motion of the crank in one direction and a stop pin 56 for limiting the motion of the crank in the opposite direction for purposes which will presently appear. There is also a suitable stop member 58 for limiting the movement of the chock block into its housing 30 as shown in Fig. 6.

For operating the chock block the projecting axis shaft 48 may be provided with an extension 60 (Fig. 3) the free end of which may project through the frame of the vehicle 1 as shown and having a head 61 for the reception of a crank or wrench 62, which may be carried on the road vehicle as indicated in Fig. 1. When the wrench or crank is applied to the head 61 the crank may be caused to turn, thus rocking the chock member on its shaft 35.

With the parts in the full line position, as shown in Fig. 5, the chock member is extended but it is not locked in extended position. The spring serves to hold the chock member in the position shown but a weight placed on the chock member may cause it to swing downwardly against the tension of the spring. To lock the chock member in its extended or operating position, the crank is turned counter-clockwise, as Fig. 5 is viewed, to shift the pin 51 over center with respect to a line between the shaft 48 and the pin 52. The parts are so constructed preferably that it takes some slight compression of the parts to shift the pin over center. This positions the crank and link in the dotted line position, as shown in Fig. 5, with the crank abutting the stop 56. Accordingly, any load on the chock member is transmitted by thrust through the link 50 and thence to the stop 56 and the chock member is effectively locked in operating position.

The chock member may be locked in its down position, as shown in Fig. 6. This is accomplished by turning the crank clockwise to the position shown, at which time the pin 51 has moved over center with respect to a straight line connecting the axis shaft 48 and the pin 52. In the position shown the spring is applying a force on the chock member tending to raise the same but this cannot happen because this force tends to rock the crank clockwise as Fig. 6 is viewed and the crank is abutted against the stop 55. However, this locked position may be released by turning the shaft 48 with the crank counter-clockwise and when the parts have been moved over center the spring 41 will elevate the chock block and hold it in a position indicated by the full lines in Fig. 5.

When the road vehicle is to be loaded with stock trucks, the several chock blocks may be conditioned as indicated by the full lines in Fig. 5. The forwardmost stock truck may then be engaged in the track and rolled to its forwardmost position in which act the several chock blocks swing down to a position as indicated in Fig. 6 as the wheels of the stock truck pass thereover and when the forwardmost stock truck reaches its final position the chock block for engaging its rear wheel assumes a blocking position by reason of the action of the spring 41. The next stock truck is similarly rolled into position and both tracks on the road vehicle may thus be completely loaded with stock trucks.

Then during the movement of the road vehicle in transporting the stock trucks to their destination it is preferable that the chocks be locked in blocking position. To do this the operator takes the wrench or crank 62 and gives a twist to each chock shaft positioning the cranks thereof to the dotted line position shown in Fig. 5. When the road vehicle is to be unloaded of the stock trucks the chocks are first adjusted to the position shown in Fig. 6, this being accomplished by applying the crank or wrench to each and turning the crank to the position shown in Fig. 6. Then the vehicles may roll backwardly in their tracks and off of the bed of the vehicle. In unloading all chocks may be locked down before any stock truck is unloaded or at the will of the operator, the rear chock may be locked down and then the rearmost stock truck removed and then the second chock locked down and the second stock truck removed and so on. The same procedure is followed regardless of whether the stock trucks are empties to be returned to the place where they are given a load of stock, or whether they are loaded with stock to be transported. Accordingly, it will be noted that as the stock trucks are loaded with stock material, regardless of whatever the material may be, the same may be transported to any other location for use for assembly or for other manufacturing steps to be performed thereon without individual handling of the material and without unloading or reloading stock trucks or other carriers or containers.

I claim:

1. A chock for use with a track for receiving a wheeled vehicle comprising, a pivotally mounted chock member positioned to project above the track to block a wheel and to be depressed relative to the track, the member having a part which substantially aligns with and forms a part of the track when the member is depressed, an operating crank, a link connecting the crank with the chock member, said crank being shiftable over center to hold the chock member in depressed position, said crank being shiftable over center in a relatively opposite position for locking the chock member in projected position.

2. A chock for use with a track for receiving a wheeled vehicle comprising, a pivotally mounted chock member positioned to project above the track to block a wheel and to be depressed relative to the track, the member having a part which substantially aligns with and forms a part of the track when the member is depressed, an operating crank, a link connecting the crank with the chock member, said crank being shiftable over center to hold the chock member in depressed position, a stop for positioning the crank in said over center position, said crank being shiftable over center in a relatively opposite position for locking the chock member in projected position, and a stop for positioning the crank in said second named over center position.

3. A chock for use with a track for receiving a wheeled vehicle comprising, a pivotally mounted chock member positioned to project above the track to block a wheel and to be depressed relative to the track, the member having a part which substantially aligns with and forms a part of the track when the member is depressed, a spring normally holding the chock member in projected position so that it may be depressed by a wheel of a vehicle passing thereover, an operating crank, a link connecting the crank and the chock member, said crank being turnable in one direction to shift the chock member to depressed position and being movable to an over center position to lock the chock member in depressed position, said crank being turnable in the opposite direction to shift the chock member to projected position and the crank being shiftable to an over center position to lock the chock member in projected position.

4. A chock for use with a track for receiving a wheeled vehicle comprising, a pivotally mounted chock member positioned to project above the track to block a wheel and to be depressed relative to the track, the member having a part which substantially aligns with and forms a part of the track when the member is depressed, a spring normally holding the chock member in projected position so that it may be depressed by a wheel of a vehicle passing thereover, an operating crank, a link connecting the crank and the chock member, said crank being turnable in one direction to shift the chock member to depressed position and being movable to an over center position to lock the chock member in depressed position, said crank being turnable in the opposite direction to shift the chock member to projected position and the crank being shiftable to an over center position to lock the chock member in projected position, and stop means for positioning the crank in each over center position.

5. The combination with a transporting vehicle, of a track on the vehicle for receiving the wheels of a plurality of smaller vehicles so that the smaller vehicles may be rolled onto the transporting vehicle and positioned one behind the other, a plurality of chocks mounted on a transporting vehicle and each including a chock member, means pivotally mounting the chock member in a position below the track so that the chock member may be projected above the track to block a wheel of a smaller vehicle and depressed substantially below the track, the chock member having a part serving as part of the track when it is in depressed position, and means for moving the chock member on its pivot and for locking it in its depressed position.

6. The combination with a transporting vehicle, of a track on the vehicle for receiving the wheels of a plurality of smaller vehicles so that the smaller vehicles may be rolled onto the transporting vehicle and positioned one behind the other, a plurality of chocks mounted on a transporting vehicle and each including a chock member, means pivotally mounting the chock member in a position below the track so that the chock member may be projected above the track to block a wheel of a smaller vehicle and depressed substantially below the track, the chock member having a part serving as part of the track when it is in depressed position, spring means for yieldably holding the chock member in projected position and means for moving the chock member to depressed position and for locking it in depressed position.

7. A chock for use with a track for receiving a wheeled vehicle comprising, a box construction adapted to be mounted below the surface of the track, a chock member, means pivotally mounting the chock member in the box construction so that the chock member may be retracted into the box, and so that the chock member may be projected above the box and the track to block a wheel, said chock member having a surface part which substantially aligns with and forms a part of the track when the chock member is retracted into the box construction, spring means interconnecting the chock member and the box construction for normally yieldably holding the chock member in projected position, so that a wheel of a vehicle may depress and pass over the chock member when the vehicle is moving in one direction, said chock member being shaped to block a wheel of the vehicle to hold the vehicle against movement in the opposite direction when the chock member is yieldably projected, an operating shaft, and means interconnecting the operating shaft for moving the chock member into retracted position against the action of the spring and including interlocking parts for locking the chock member in projected position and in retracted position.

GILBERT R. FORBAS.

REFERENCES CITED

The following references are of record in the file of this patent:

UNITED STATES PATENTS

| Number | Name | Date |
|---|---|---|
| 1,387,036 | Benson et al. | Aug. 9, 1921 |
| 1,577,173 | Capra | Mar. 16, 1926 |
| 1,643,885 | Gill | Sept. 27, 1927 |
| 1,738,008 | Johnson | Dec. 3, 1929 |
| 2,496,916 | Kershaw | Feb. 7, 1950 |

FOREIGN PATENTS

| Number | Country | Date |
|---|---|---|
| 14,764 | Great Britain | Sept. 18, 1890 |